July 16, 1968     R. K. CHAIMSON     3,392,951
VARIABLE PITCH BRACKET

Filed Feb. 27, 1967     2 Sheets-Sheet 1

INVENTOR
ROBERT K. CHAIMSON

July 16, 1968     R. K. CHAIMSON     3,392,951
VARIABLE PITCH BRACKET

Filed Feb. 27, 1967     2 Sheets-Sheet 2

INVENTOR
ROBERT K. CHAIMSON

BY *Melvin L. Crane* AGENT

*R. Chaimson* ATTORNEY 3,392,951
VARIABLE PITCH BRACKET
Robert K. Chaimson, Cheverly, Md., assignor to the
United States of America as represented by the Secretary of the Navy
Filed Feb. 27, 1967, Ser. No. 619,541
7 Claims. (Cl. 248—291)

ABSTRACT OF THE DISCLOSURE

This invention is directed to a variable pitch bracket which may be manually opened and locked into place by use of spring loaded latches. When opened, the bracket includes a pair of base plates which may be positioned relative to each other at any desired angle. The shaft is provided with a 90 degree marker for exact adjustment of the base plates and a hand operated handle may be rotated to adjust the plates for more or less than an angle of 90 degrees. The handle is provided with a finger operated button which releases a pair of pawls that hold the shaft in place in order to automatically fold the base plates into a compact assembly by spring action.

---

The present invention relates to an assembly for mounting a camera or any other desired device onto a bracket and more particularly to a device in which the pitch may be easily varied and the device closed for compactness by a simple hand operated mechanism.

Heretofore, camera holders as well as other devices have been developed in which parts are adjustable relative to each other for various reasons. The devices are cumbersome, not easily operated, do not contain positive stops and are not readily collapsible for stowage.

The device of the present invention provides an adjustable assembly which is easily adjustable, easily opened into a usable device and easily collapsed for stowage. The device finds use as a camera holder for an astronaut in orbit who is required to take pictures at different angles wherein the device is easily adjusted and easily collapsed for stowage. Stowage is a real problem on board a satellite capsule therefore it is desired to make use of devices which may be usable when needed and yet assembled for compact stowage in order to use as little space as possible. Since astronauts are kept busy, it is desired to provide instrumentation which requires as little work and time for operation as possible. Thus, the device of the present invention has been developed for easy quick operation and to require as little stowage space as possible.

It is therefore an object of the present invention to provide a variable pitch bracket which may be easily operated and stored in a compact arrangement.

Another object is to provide a variable pitch bracket which has a positive stop in each direction to provide a specific range of operation.

Still another object is to provide a bracket device which may be quickly released for stowage and easily operated by hand to position the device into use.

Yet another object is to provide a bracket for centering a camera and in which the pitch angle may be easily changed.

While still another object is to provide an adjustable bracket which is rigid during operation yet easily adjusted and folded for stowage.

Figure 1:
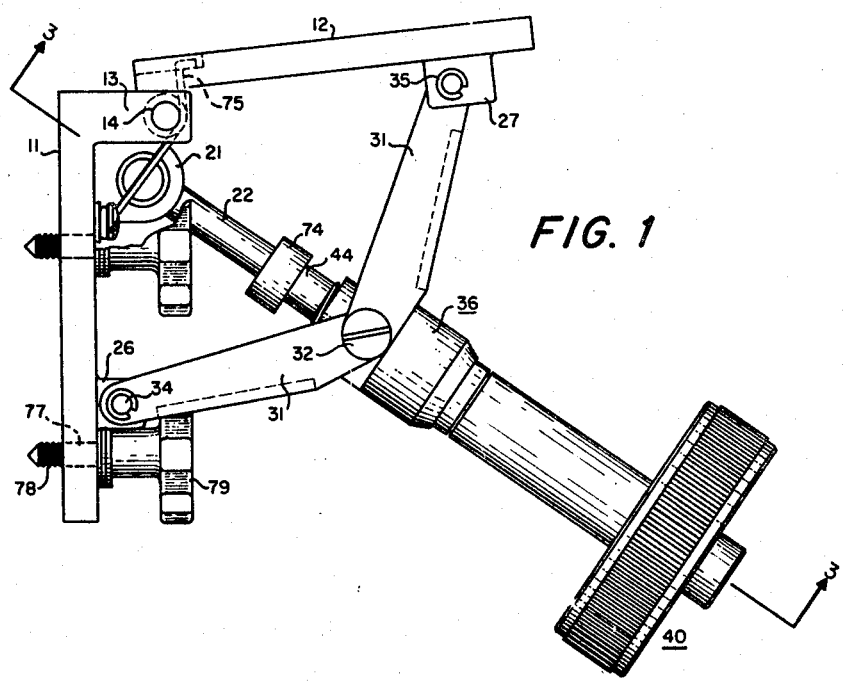
Figure 2:
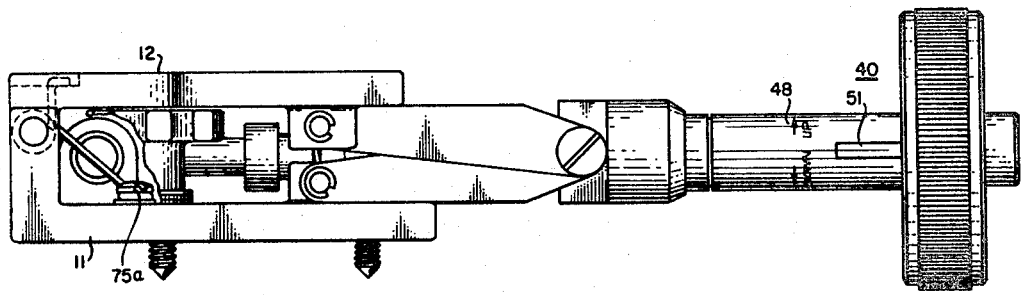
Figure 3:
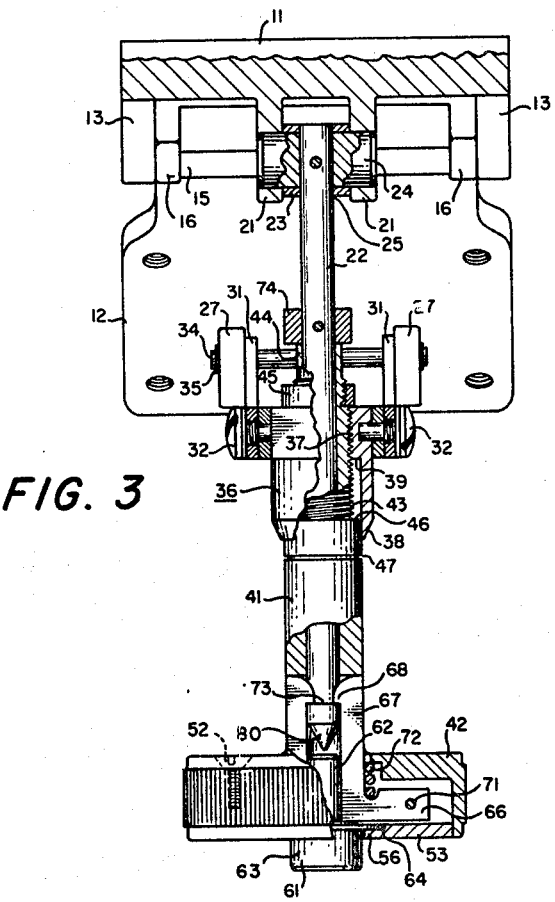
Figure 4:
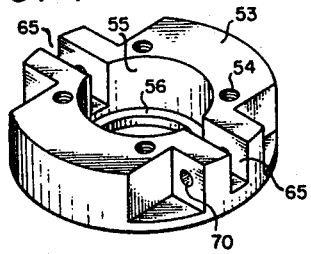

These and other objects of the invention will appear from the following description when taken in connection with the accompanying drawing, in which:

FIG. 1 illustrates the bracket in an open position;
FIG. 2 illustrates the bracket in a stowed position;
FIG. 3 is a cross-sectional view of the device as shown by FIG. 1 when in the open position; and
FIG. 4 illustrates a mounting block which aids in operation of the device.

The bracket device is made with two flat plates that are secured together at one end for angular movement relative to each other. The opposite ends of the plates are connected by separate links to an adjustable nut at the same point. The adjustable nut is moveable along a shaft which is connected at one end to one of the plates such that the angle formed by the plates may be changed. The shaft extends outwardly from the nut and a hand operated handle is secured about the shaft and screw-threaded into the nut for adjustment of the angular relationship between the plates. The handle is also provided with opposing latches that cooperate with the shaft to hold the plates in a particular position and a finger operated button on the handle controls the latches to release the shaft. As the shaft is released, springs operate against the plates to fold the plates alongside the shaft for compact stowage. The plates are secured relative to each other such that they can be positioned at right angles and adjustable for greater or less than a right angle in use and when stowed, the plates are parallel to each other.

Now referring to the drawings there is shown by illustration a variable pitch, easily stored bracket which may be used for mounting a camera or any other desired object. As shown, the device includes a pair of flat plates 11 and 12. Plate 11 is of L-shape having projections 13 at one end thereof each of which include an aperture 14 therethrough. A shaft 15 is passed through the aperture 14 to secure thereto plate 12 which is provided with protrusions 16 inwardly of one end thereof that fit between the protrusions on plate 11. Protrusions 16 are also provided with suitable apertures through which the shaft 15 passes. The end of plate 12 adjacent to the protrusions is cut-away such that the ends 13 of plate 11 may pass to permit relative movement between the two plates.

Plate 11 is also provided with spaced projections 21 on opposite sides of the center line and inwardly from the end projections to provide a bearing race. A shaft 22 is secured between spaced projections 21 by use of a spacer 23 and a pin 24 that passes through the bearing race. The spacer and pin are provided with an aperture 25 within which the end of the shaft fits. The shaft is held stationary while the plate 11 rotates relative thereto toward and away from the shaft. Plate 11 is also provided with spaced lugs 26 on opposite sides of the center line and near the opposite end thereof. Plate 12 is provided with spaced lugs 27 near the outer end thereof on opposite sides of the center line. The spacing between lugs 27 is greater than the spacing between lugs 26, the purpose of which will be explained later.

A pair of U-shaped links 31 having end extensions are secured one each to lugs 26 and 27 of the plates by a suitable pin 34 and retainer ring 35 such that there is free movement between the lugs and each of the links. The opposite end extension of each link is secured by a screw 32 for relative movement to a nut 36 that slips over shaft 22. The end of the nut to which the links are secured is square on the outer surface and is provided with threads 37 on the inside cylindrical surface thereof. The nut also includes a cylindrical outer portion 38 along which the inner cylindrical surface is not provided with threads. The inner diameter of the end which is not threaded forms a shoulder 39 along the inner surface of the nut, the purpose of which will be explained later. When each of the links are secured at one end to the plates and at the opposite end to the nut about the shaft, the shaft intersects the angle formed between the plates and movement of the nut along the shaft moves the plates toward and away from the shaft in equal amounts.

In order to adjust the plates for different pitch with respect to a 90 degree relationsihp of the plates handle 40 is provided. The handle is formed of one piece, milled to include an elongated tubular section 41 that extends along the shaft and an enlarged knob-like end 42 which is knurled on the outer surface to aid in gripping the handle for rotation thereof. The enlarged end is also milled out to include therein other operational elements. The tubular end 41 is of greater inside diameter than the diameter of shaft 22 to permit freedom of axial movement relative to each other. The end of the tubular section is milled down to provide a threaded portion 43 which threads into the threads on the inner surface of nut 36. The end 44 of the tubular portion is milled down still further and partially threaded to receive thereon a locknut 45 to provide a stop which may be adjusted for adjusting the pitch of the plates as the tubular portion is threaded into the nut. The shaft end of the threaded portion 43 that screws into the nut provides a shoulder 46 that matches the shoulder 39 on the inside of the screw-threaded portion of the nut to act as a stop for the opposite rotational direction of the handle from that in which the lock nut acts as a stop. The tubular portion is also provided with a groove 47 which operates as a marker in cooperation with the end of the nut 36 to indicate that the plates are at 90 degrees relative to each other. Thus, when the end 38 of the nut 36 aligns with the groove 47 in the tubular end of the handle, an operator knows that the plates are normal to each other. The handle is also provided with arrows 48 to indicate the direction of rotation of the handle to change the pitch of the plates such that they are not normal to each other.

In use, the plates are at an angle with respect to each other as shown by FIG. 1 and when stowed they are parallel to each other as shown in FIG. 2. Thus, a simple mechanical arrangement is used to control the operation for plate positioning. As previously mentioned, the knob-like end of the handle has been milled out and in addition opposing slits 51 have been milled into the tubular section near the knob 42 including slits in the bottom of the knob. The knob also includes four equally spaced apertures therein for reception of screws 52 that secure a mounting block 53 within the milled end of the knob. The mounting block is provided with four threaded holes 54 therein that align with the apertures in the handle for the purpose of securing the mounting block within the knob. The mounting block serves two purposes: (1) it has a centrally located aperture 55 therethrough with a lesser diameter portion 56 on the outer surface to provide a shoulder 56. The shoulder secures within the aperture a thumb or finger operated button 61. The button has a smaller cylindrical portion 62 that extends through the aperture in the mounting block into the passage within the tubular section of the handle. A larger cylindrical portion 63 extends outwardly from the mounting block, and a cylindrical shoulder 64 matches with the shoulder on the mounting block in order to prevent the button from being forced from the mounting block. (2) The mounting block is provided with opposing axially and radially extending slots 65 just below the outer surface. An L-shaped latch or pawl having a radially extending portion 66 and an axially extending portion 67 is secured in the slots in the mounting block. The axially extending end is provided with a catch 68 and the radially extending end has an aperture therethrough such that the latch is secured in the mounting block by a pin 71 normal to the slot that passes through the aperture 70 in the block and through the aperture in the radially extending end of the latch. The axially extending portion extends through the slots in the hand knob and into the axial slots in the tubular section of the handle and is permitted to move radially about the pin mounting in the mounting block. A spring 72 surrounding the latches between the bottom of the milled out end of the knob and the latches forces the latches inwardly toward the axis of the tubular end of the handle. It is to be noted that the catches 68 in the latches are directed toward the axis of the handle. The outer end of the shaft 22 is provided with a groove 73 therein into which the latches enter in order to secure the shaft at that position relative to the handle. When the shaft is secured in place by the latches the plates 11 and 12 are in their open position. The previously mentioned button 61 acts against the spring pressed latches to force the latches radially from the slot in the shaft thereby freeing the shaft for axial movement relative to the handle. The end of the shaft is provided with a relatively sharp point 80 in order to open the pawls when the plates are opened and the handle is locked in place by the pawls relative to the shaft.

The tubular portion of the handle is of a length that the inner end terminates against a collar 74 on the shaft 22. The collar is adjusted with respect to the end of the handle so that the handle can be forced toward the plate end only a specific distance. This distance is determined by the length of the tubular section of the handle and the groove 73 in the end of the shaft within which the pawls catch. Thus, when the device is in an open position the inner end 44 of the handle rotates against the collar on the shaft and the pawls within the knob end of the handle rotate within the groove in the end of the shaft. The collar is adjusted such that there is very little handle play linearly of the shaft.

The plates are spring operated by a spring 75 held in place by screw 75a such that the spring forces the plates toward the shaft into a closed position in parallel relationship as shown in FIG. 2. Thus, when the plates are in an open position with the latches securing the shaft in position relative to the handle and the button is pressed thereby moving the latches away from the notched shaft, the springs force the plates toward each other. Since the end of the shaft is secured to one of the plates, the shaft will be moved axially away from the handle. Since the links are secured to the nut around the shaft and the shaft is moved away relative to the nut, the links will extend along the shaft permitting the plates to close. Previously it was stated that the links are of different width. Therefore, one link will overlap the other link along the shaft permitting the plates to be stowed in a compact parallel relationship along the shaft.

Heretofore, the handle was described as having a tubular section that extended over the shaft and is provided with a threaded end that screw-threads into the nut to which the links are connected. The nut is freely moveable along the shaft, thus the nut is used to adjust the pitch of the plates relative to each other. For a 90 degree relationship, the handle is rotated moving the nut axially until the end 38 of the nut shown free of threads aligns with the groove 47 in the tubular portion of the handle. For a pitch down, or for an angle greater than 90 degrees, the nut is moved along the shaft toward the plates away from the 90 degree mark by rotation of the handle which is threaded into the nut. Of course for a pitch up or for an angle less than 90 degrees, the end of the nut is moved axially along the shaft toward the handle and beyond the 90 degree line marker. Thus, the handle is used to adjust the angular relationship of the plates relative to each other. For collapsing the plates for compact stowage, the button at the end of the handle is pushed opening the pawls to release the shaft thereby permitting collapse of the plates into parallelism.

In order to limit the pitch for a positive number of degrees a lock nut 45 is secured on the threaded end 44 of the shaft that limits movement of the nut in a direction toward the plates which provides an angle between the plates which is greater than 90 degrees. As previously explained, the inside of the nut is provided with a shoulder 39 which aligns with a shoulder 46 on the tubular member to limit movement of the nut toward the handle resulting in an angular relationship of less than 90 degrees between the plates. Of course if desired the lock nut and shoulder arrangement could be omitted thereby permitting a greater angular relationship between the plates, if desired. Also, the lock nut is adjustable to change the angular relationship of the device as previously described.

Since the device was developed for mounting a camera for use by an astronaut during orbit, one of the plates is provided with apertures through which a shaft 77 passes and is threaded on the end 78 extending through the plate. The shafts are held there by a ring on the threaded side and a notched knob 79 on the opposite side secured to the end of the threaded shaft. The shaft 77 secures the bracket to the space craft permitting freedom of rotation of the shaft by the knob during threading the end into the mounting block on the space craft. The camera is held to the other plate. Obviously the device may be used for many other purposes. As can be seen, the device is easily operated and can be stored within a minimum of space when closed.

In operation, the device is assembled and readied for use. Assume that the device is assembled and in its stowed position with plate 11 secured to the space craft at a desired place and the camera is secured to the other plate. The links between the plates and the shaft will be positioned lengthwise along the shaft in an overlapping condition because one link is wider than the other. The plates are parallel to each other and also along the length of the shaft. Thus, little space is used for stowage in the closed condition. Now assuming that the device is to be used for directing the camera in a specific direction, the plate with the camera thereon is pulled in a direction away from the axis moving the nut to which the links are connected closer to the plate connection. Since the end of the tubular portion of the handle is screw-threaded into the nut the handle will be drawn along the shaft with the nut. Since the shaft is secured at one end to the plate the nut and handle will be moved along the shaft. When the plates have been moved out sufficiently and the handle moved along the shaft sufficiently the pawls in the handle will be forced into the groove near the upper end of the shaft and the inner end of the tubular portion of the handle will rest against the collar 74 on the shaft. This will lock the handle in place relative to the shaft, and the plates will be locked at an angle relative to each other. The camera will now be directed out substantially in the desired direction. Plate 11 acts as a base support and the plate 12 supports the camera. Adjustment of the line of sight for the camera is carried out by rotation of the handle. As mentioned previously, alignment of the end of the nut with the groove in the tubular extension indicates that the two plates are normal to each other. In order to change the pitch of the camera direction, the handle may be turned to the right or left depending on whether the pitch is to be up or down. In order to make it easy for the operator arrows have been marked on the handle to indicate the direction in which the handle should be turned to change the pitch. As the handle is rotated, the nut to which the links are connected is moved along the shaft thereby shifting the relative positions of the plates and thereby the angular relationship of the plates is shifted.

In operation, it is to be noted that the lock nut may be adjusted to limit the pitch angle or the angular relationship between the two plates.

When it is desired to stow the device, or collapse the plates, the center button in the handle is pushed in, thereby forcing the pawls from the groove in the end of the center shaft. As the pawls are forced from the groove, the spring behind the plates forces the plates inwardly toward the shaft thereby forcing the nut along the shaft and closing the plates.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed and desired to be secured by Letters Patent of the United States is:

1. A variable pitch bracket which comprises:
   first and second plates each of which has a flat surface on one side thereof,
   means for securing one end of each of said plates relative to each other for angularly positioning said flat surface at a desired angle relative to each other,
   a shaft secured at one end thereof relative to said means for securing said plates relative to each other,
   a nut means secured over said shaft for movement along said shaft,
   a link secured between the nonconnected end of each of said plates and said nut for relative movement between their connection points, and
   drive means secured to said nut for moving said nut linearly along said shaft with movement of said links connected thereto, thereby changing the angular relationship of the flat sides of said first and second plates.

2. A variable pitch bracket as claimed in claim 1, wherein:
   stop means are provided for limiting the angular relationship between the flat surfaces on said first and second plates.

3. A variable pitch bracket as claimed in claim 2, wherein:
   said drive means comprises screw threads thereon, and
   said nut includes screw threads thereon that engage said screw threads on said drive means.

4. A variable pitch bracket as claimed in claim 3, wherein:
   said drive means includes a tubular section that extends along said shaft in which said tubular section includes said screw threads thereon, and
   a knob on the outer end of said tubular section.

5. A variable pitch bracket as claimed in claim 4, wherein:
   said shaft extending from said plate connection includes a groove in the circumference thereof near the outer end thereof,
   opposing pawls secured within said knob on the outer end of said tubular section, extending linearly of said tubular section and secured at one end thereof for radial movement relative to said shaft,
   said pawls adapted to catch in said groove in said shaft thereby securing said tubular member and said end knob for rotation relative to said shaft while preventing linear movement of said tubular section relative to said shaft,
   whereby said flat surfaces of each of said plates are secured in an open position and adjustable relative to each other by rotation of said tubular section thereby moving said nut axially of said shaft.

6. A variable pitch bracket as claimed in claim 5 in which,
  spring means is provided to force said pawls radially toward said shaft.

7. A variable pitch bracket as claimed in claim 5, wherein:
  said knob includes a movable button operative to release said pawls from said shaft thereby permitting said plates to fold alongside said shaft, and
  spring means for forcing said plates into a closed position relative to said shaft.

References Cited

UNITED STATES PATENTS

| | | | |
|---|---|---|---|
| 681,614 | 8/1901 | Bowen et al. | 248—291 XR |
| 1,811,880 | 6/1931 | Dina | 248—11 XR |
| 1,838,750 | 12/1931 | Dina | 248—11 |
| 3,164,353 | 1/1965 | Rene | 248—237 |

JOHN PETO, *Primary Examiner.*